(12) United States Patent
Legris

(10) Patent No.: US 9,365,252 B2
(45) Date of Patent: Jun. 14, 2016

(54) ADJUSTABLE SEAT SUPPORT

(76) Inventor: Jean-Pierre Legris, Longueuil (CA)

(\*) Notice: Subject to any disclaimer, the term of this patent is extended or adjusted under 35 U.S.C. 154(b) by 248 days.

(21) Appl. No.: 13/878,086

(22) PCT Filed: Oct. 5, 2011

(86) PCT No.: PCT/CA2011/001123
§ 371 (c)(1),
(2), (4) Date: Apr. 5, 2013

(87) PCT Pub. No.: WO2012/045158
PCT Pub. Date: Apr. 12, 2012

(65) Prior Publication Data
US 2013/0200242 A1    Aug. 8, 2013

Related U.S. Application Data

(60) Provisional application No. 61/344,786, filed on Oct. 5, 2010.

(51) Int. Cl.
| | |
|---|---|
| *B62J 1/00* | (2006.01) |
| *B62J 1/08* | (2006.01) |
| *B62J 1/12* | (2006.01) |
| *B60N 2/16* | (2006.01) |
| *B63B 29/00* | (2006.01) |

(52) U.S. Cl.
CPC ............. *B62J 1/00* (2013.01); *B60N 2/1615* (2013.01); *B62J 1/08* (2013.01); *B62J 1/12* (2013.01); *B63B 29/00* (2013.01)

(58) Field of Classification Search
CPC ............... B62J 1/08; B62J 1/12; B62J 1/00; B60N 2/1615; B63B 29/00
USPC ................ 248/419, 585, 586, 584, 631, 421, 248/288.11
See application file for complete search history.

(56) References Cited

U.S. PATENT DOCUMENTS

| | | | | |
|---|---|---|---|---|
| 5,660,437 A | * | 8/1997 | Bauer et al. | 297/237 |
| 8,585,004 B1 | * | 11/2013 | Roeglin et al. | 248/421 |
| 2006/0237885 A1 | * | 10/2006 | Paillard et al. | 267/140.15 |

FOREIGN PATENT DOCUMENTS

| | | | |
|---|---|---|---|
| FR | 2790438 A1 | * | 9/2000 |
| NL | 1005488 C6 | * | 7/1997 |

\* cited by examiner

*Primary Examiner* — Anita M King
(74) *Attorney, Agent, or Firm* — Equinox IP

(57) ABSTRACT

An adjustable seat support (100, 200, 300) for a vehicle (10) having a frame (12), comprising a support member (102) adapted to support a seat (110), at least one support bracket (104a, 104b, 204a, 204b, 304a, 304b) pivotally connecting the support member (102) to a first position of the frame (12) of the vehicle (10) and an actuator (109) pivotally connecting the at least one support bracket (104a, 104b, 204a, 204b, 304a, 304b) to a second position of the frame (12) of the vehicle (10), wherein movement of the actuator (109) raises and lowers the support member (102).

15 Claims, 7 Drawing Sheets

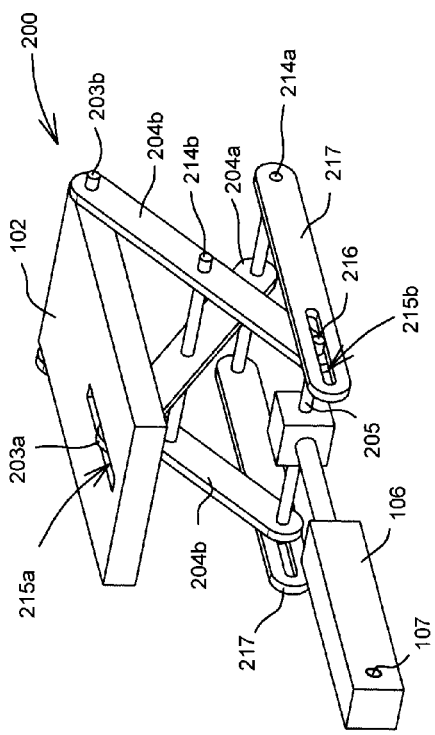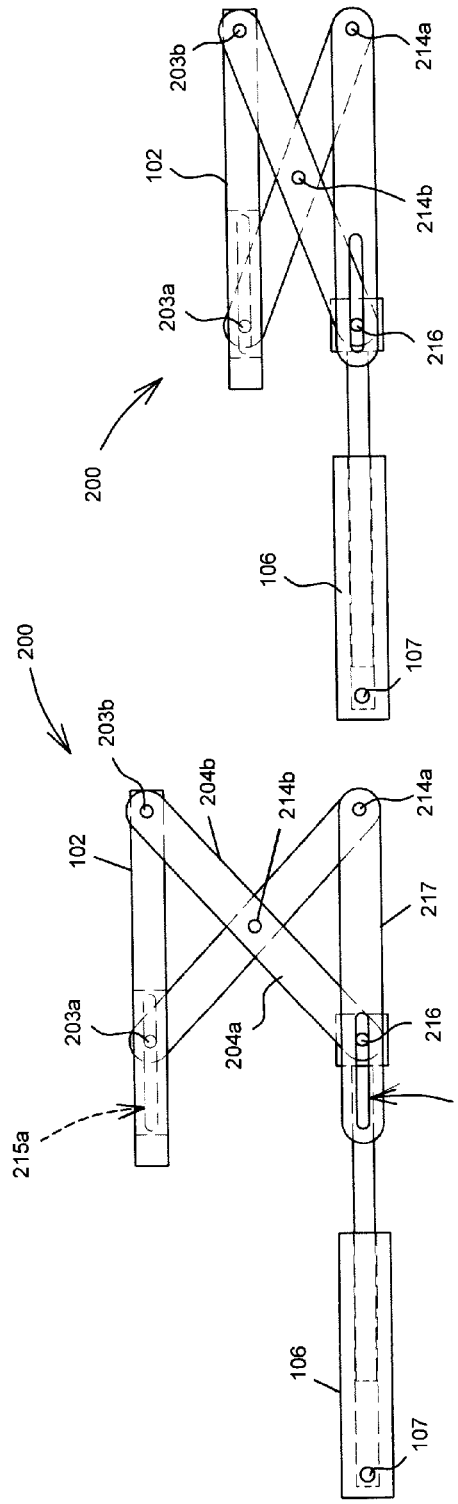
Fig. 6
Fig. 7A
Fig. 7B

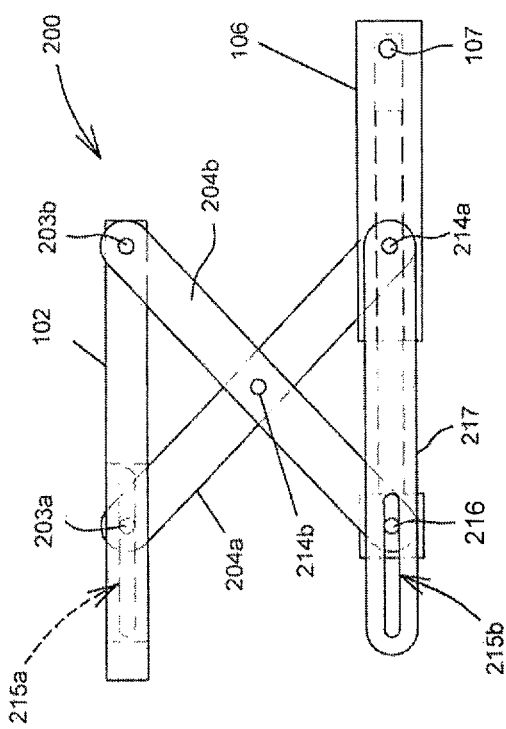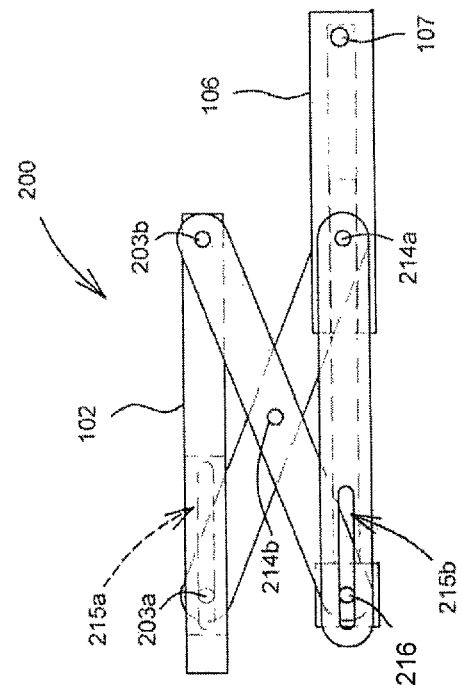

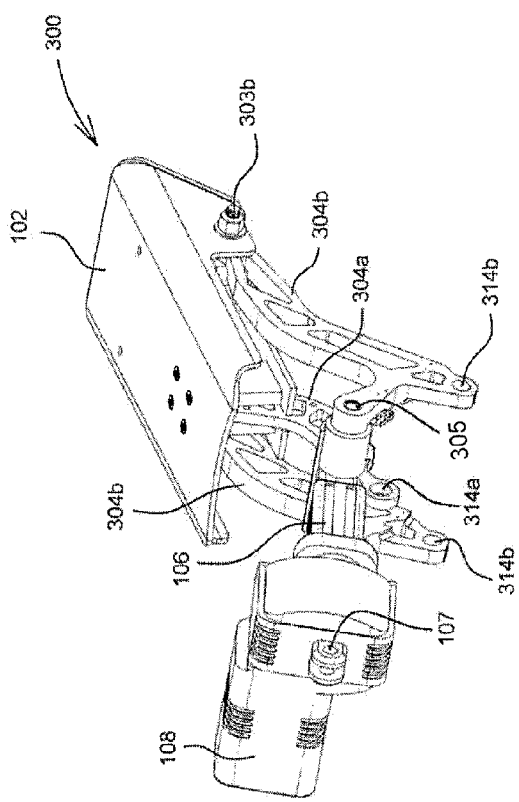
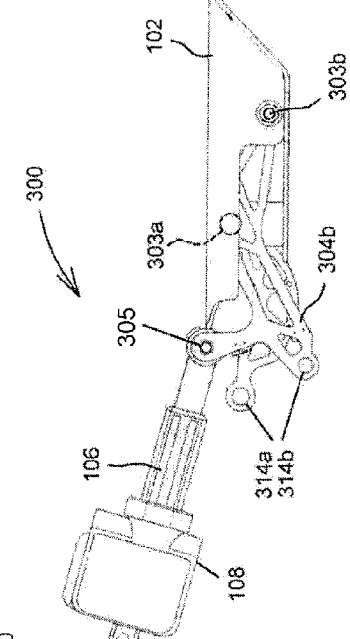
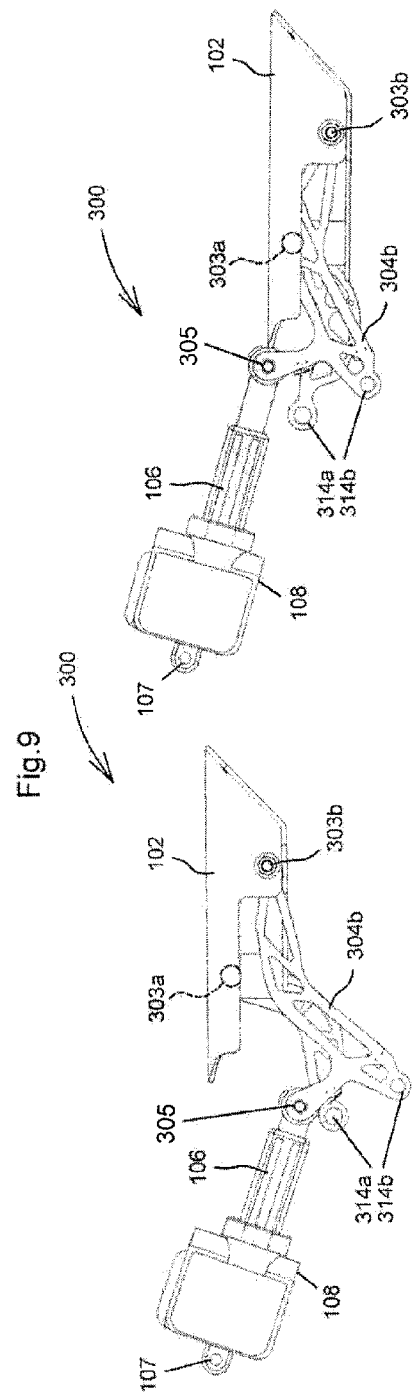

ADJUSTABLE SEAT SUPPORT

CROSS-REFERENCE TO RELATED APPLICATIONS

This application claims the benefits of U.S. provisional patent application No. 61/344,786 filed on Oct. 5, 2010, which is herein incorporated by reference.

TECHNICAL FIELD

The present disclosure relates to an adjustable seat support. More specifically, the present disclosure relates to an adjustable seat support for use with motorcycles, snowmobiles, watercrafts, three and four wheel off-road vehicles, etc.

BACKGROUND

Some models of motorcycles offer two different seat heights, which can be adjusted with tools at the dealership, i.e. the seat height is then fixed and tools are need to change it again. However, there is no mechanism currently available on a motorcycle, snowmobile, watercraft, three and four wheel off-road vehicle, etc., to change the seat position in real-time and allow the accommodation of several driving ergonomics and user body configurations, and thus reduce muscle fatigue that may result from the same driving position and adapt to the driving style of the rider.

Accordingly, there is a need for an adjustable seat support for use with motorcycles, snowmobiles, watercrafts, three and four wheel off-road vehicles, etc.

SUMMARY

The present disclosure provides an adjustable seat support for a vehicle having a frame, comprising a support member adapted to support a seat, at least one support bracket pivotally connecting the support member to a first position of the frame of the vehicle and an actuator pivotally connecting the at least one support bracket to a second position of the frame of the vehicle, wherein movement of the actuator raises and lowers the support member.

BRIEF DESCRIPTION OF THE FIGURES

Embodiments of the disclosure will be described by way of examples only with reference to the accompanying drawings, in which:

FIG. 6 is a perspective view of the adjustable seat support in accordance with a second illustrative embodiment of the present disclosure;

FIGS. 7A and 7B are side views of the displacement of the adjustable seat support of FIG. 6 in a push configuration in a raised and a lowered positions, respectively;

FIGS. 8A and 8B are side views of the displacement of the adjustable seat support of FIG. 6 in a pull configuration in a raised and a lowered positions, respectively.

FIG. 9 is a perspective view of the adjustable seat support in accordance with a third illustrative embodiment of the present disclosure; and FIGS. 10A and 10B are side views of the displacement of the adjustable seat support of FIG. 9 in a pull configuration in a raised and a lowered positions, respectively.

Similar references used in different Figures denote similar components.

DETAILED DESCRIPTION

Generally stated, non-limitative illustrative embodiments of the present disclosure provide an adjustable seat support and more specifically an adjustable seat support for use with motorcycles, snowmobiles, watercrafts, three and four wheel off-road vehicles, etc., in order to reduce muscle fatigue that may result from having the same driving position for long periods of time and also optimize the position of the center of mass of the rider which results in completely different road manners. The adjustable seat support may be controlled electronically, pneumatically, hydraulically, mechanically, etc., so as to accommodate different driving ergonomics or user body configurations. The adjustment can be done at any time, while in motion or stationary.

Figure 1:
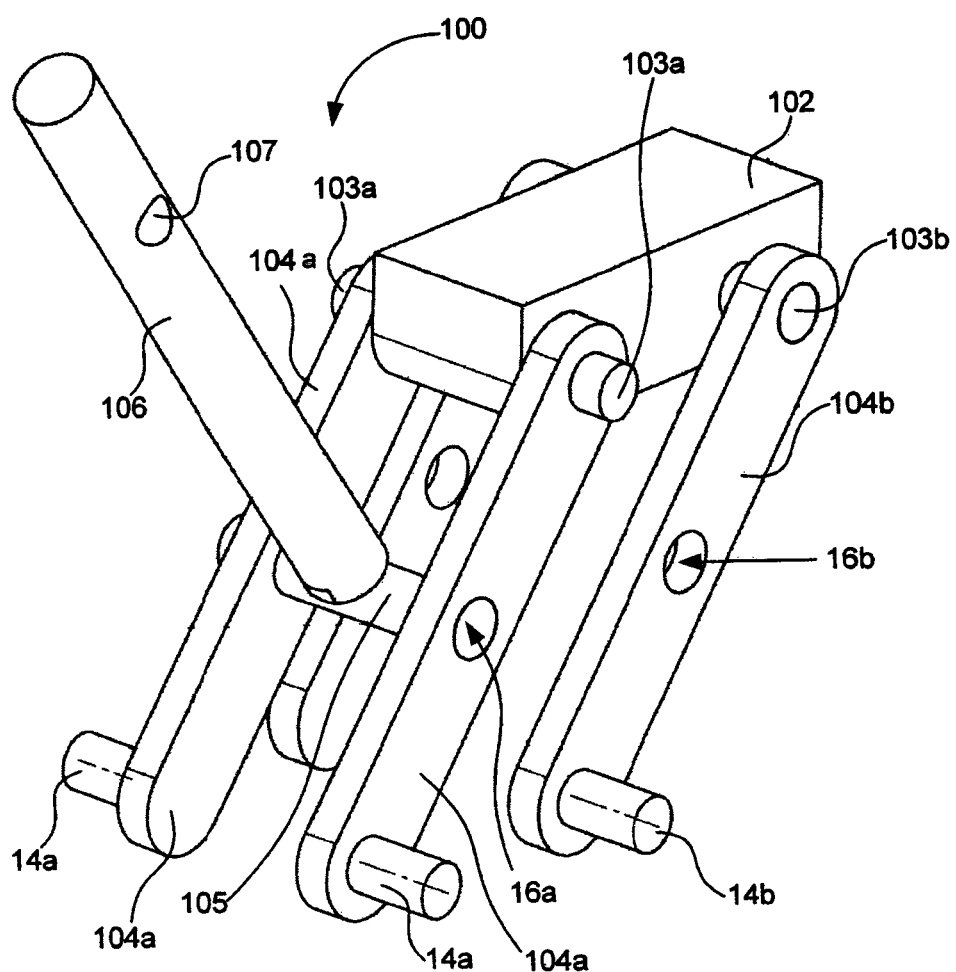
FIG. 1 is a perspective view of the adjustable seat support in accordance with a first illustrative embodiment of the present disclosure.

Referring to FIG. 1, there is shown an adjustable seat support 100 in accordance with an illustrative embodiment of the present disclosure. The adjustable seat support 100 is generally composed of a support member 102 adapted to support a seat, a pair of front 104a and rear 104b support brackets pivotally connecting the support member 102 to a vehicle frame via pivot members 103a, 103b and 14a, 14b, respectively, and an actuator link 106, which pivotally connects the front support brackets 104a to the vehicle frame via pivot members 105 and 107, respectively.

It is to be understood that although the actuator link 106 is pivotally connected to the front support brackets 104a through pivot member 105, which engages pivot receiving structure 16a, in an alternative embodiment the actuator link 106 may be pivotally connected to the back support brackets 104b by engaging the pivot member 105 with pivot receiving structure 16b.

In the illustrative embodiment, the front 104a and rear 104b support brackets are advantageously disposed with respect to the support member 102 such that they may pass each other during the raising and lowering of the support member 102, i.e. the spacing between each of the front support brackets 104a and the spacing between each of the rear support brackets 104b allow the front 104a or rear 104b support brackets to pass between the rear 104b or front 104a support brackets. However, the front 104a and rear 104b support brackets may be disposed such that they may not pass each other during the raising and lowering of the support member 102, thus limiting the range of movement of the support member 102. It is to be understood that although the front 104a and rear 104b support brackets are shown in the illustrative embodiment as being parallel, they may be disposed otherwise in an alternative embodiment in order to control and vary the seat angle.

Figure 2:
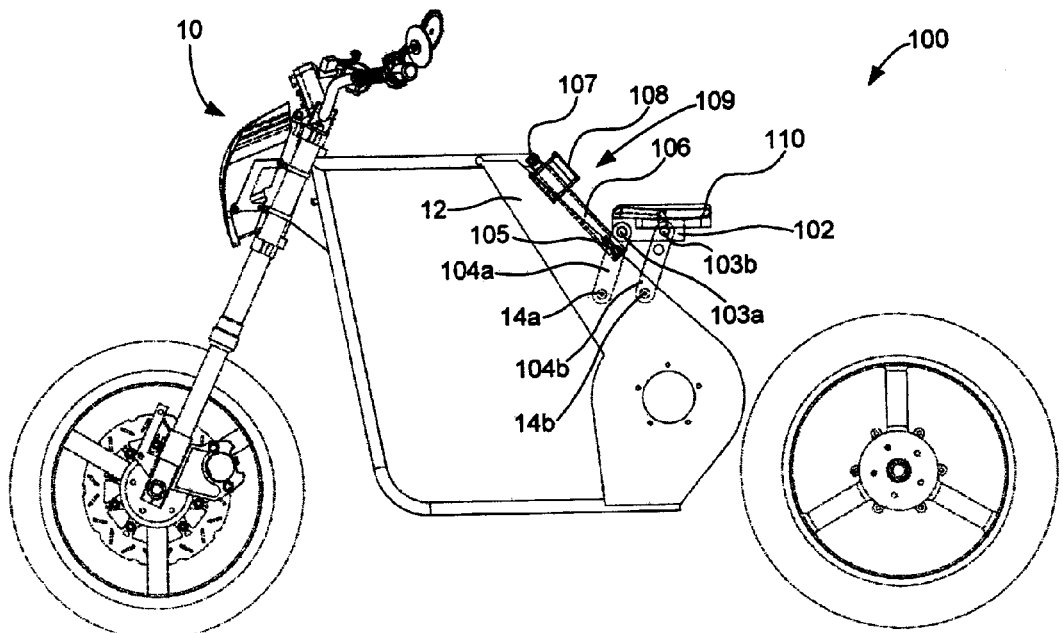
FIG. 2 is side elevation view of the adjustable seat support of FIG. 1 attached to a motorcycle in a pull configuration and in a raised position.
Figure 3:
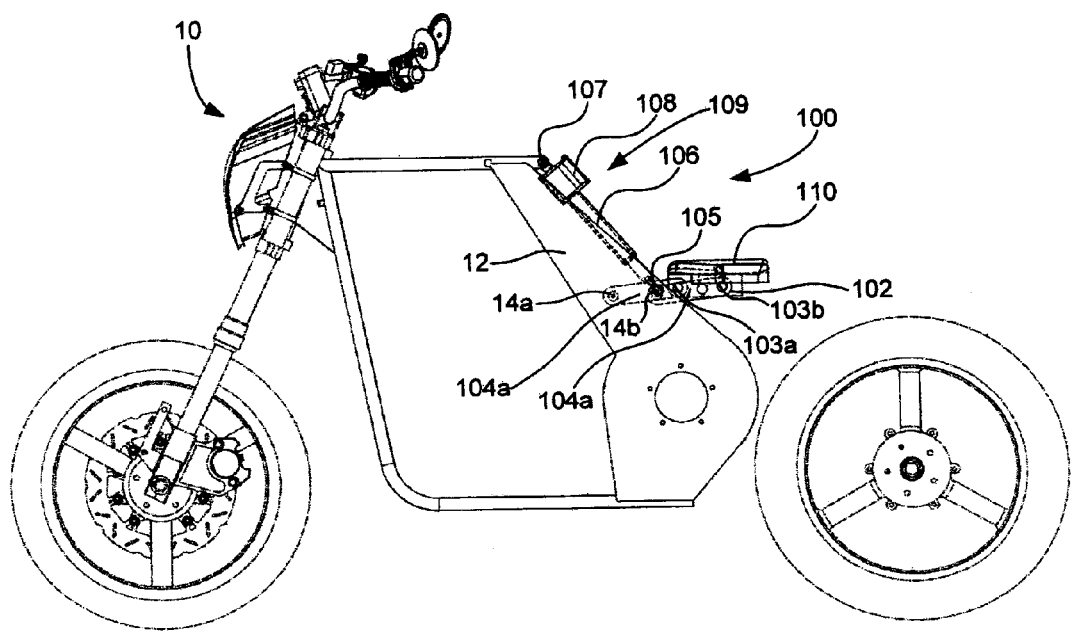
FIG. 3 is side elevation view of the adjustable seat support of FIG. 1 attached to a motorcycle in a pull configuration and in a lowered position.

Referring to FIGS. 2 and 3, there is shown the adjustable seat support 100 attached to a motorcycle 10 in a pull configuration and in a raised (FIG. 2) or lowered (FIG. 3) position. Front 14a and rear 14a bracket pivot members pivotally connect the front 104a and rear 104b support brackets, respectively, to a first position on the frame 12 of the motorcycle 10 while actuator pivot member 107 pivotally connects the actuator link 106 to a second position on the frame 12 of the motorcycle 10, the first and second positions being spaced apart. The actuator link 106 is further operatively connected to an actuation mechanism 108 forming actuator 109, for example a linear actuator. It is to be understood that although the following disclosure refers to a motorcycle, same may be applied to other types of vehicles such as snowmobiles, watercrafts, three and four wheel off-road vehicles, etc.

The height of the seat 110, which is attached to the support member 102, is controlled by activating the actuation mechanism 108 of the actuator 109, which contracts (FIG. 2) or expands (FIG. 3) the actuator link 106 in order to pivot the front 104a and rear 104b support brackets. The actuator 109 may be electronic, pneumatic, hydraulic, mechanical, etc., in nature and may be controlled by a user using a button, joystick or other user interface.

Figure 4C:
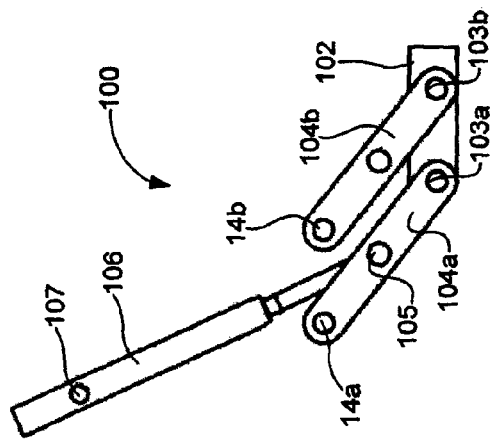
FIGS. 4A, 4B and 4C are side views of the displacement of the adjustable seat support of FIG. 1 in a pull configuration when going from a raised position to a lowered position.
Figure 4B:
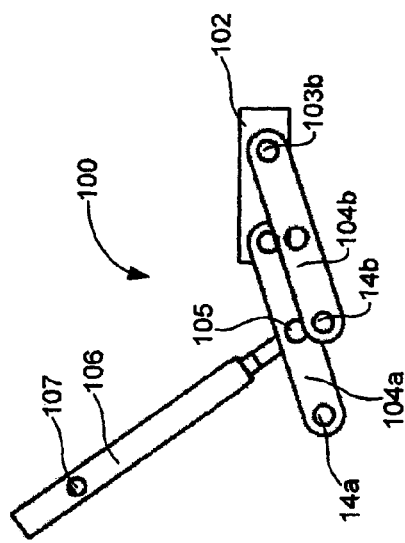
Figure 4A:
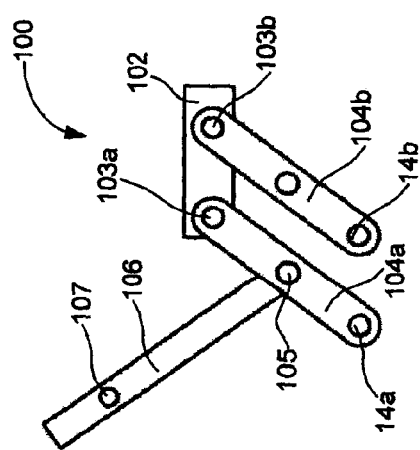

Referring to FIGS. 4A to 4C, there is shown the displacement of the adjustable seat support 100 components in a pull configuration, going from a raised position (FIG. 4A) to a lowered position (FIG. 4C). In this configuration, the pivotal movements of the front 104a and rear 104b support brackets move the support member 102 from a completely raised position to a completely lowered position as the actuator link 106 expands from a completely retracted position (FIG. 4A) to a completely expanded position (FIG. 4C). It is to be understood that, although not shown in FIGS. 4A to 4C, pivot members 107, 14a and 14b are pivotally connected to the frame 12 of the motorcycle 10 (see FIGS. 2 and 3), pivot member 107 being pivotally connected to a position that is higher on the frame 12 then the position of pivot members 14a and 14b, and thus each remains in a fixed position.

Figure 5C:
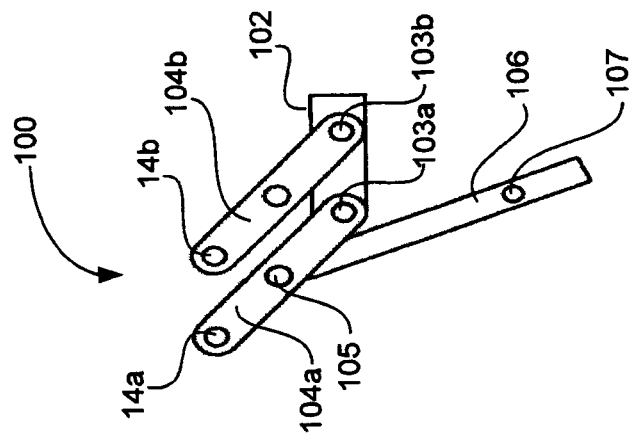
FIGS. 5A, 5B and 5C are side views of the displacement of the adjustable seat support of FIG. 1 in a push configuration when going from a raised position to a lowered position.
Figure 5B:
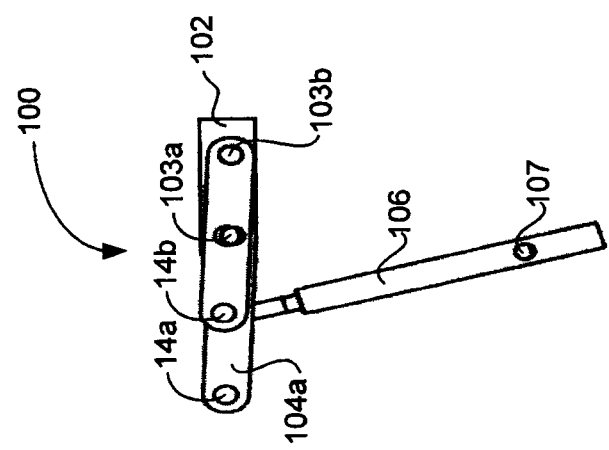
Figure 5A:
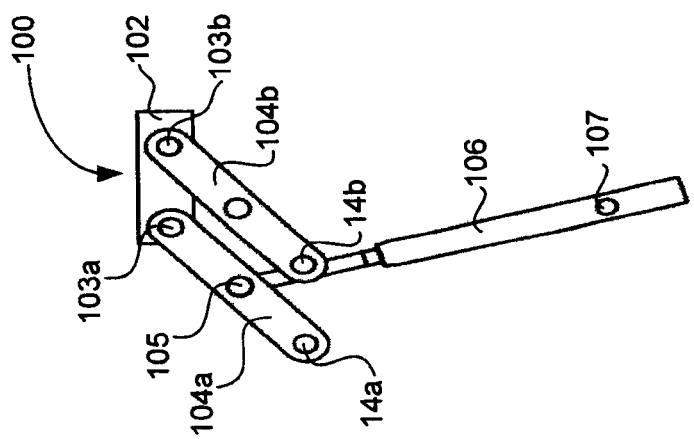

Referring to FIGS. 5A to 5C, there is shown the displacement of the adjustable seat support 100 components in a push configuration, going from a raised position (FIG. 5A) to a lowered position (FIG. 5B). In this configuration, the pivotal movements of the front 104a and rear 104b support brackets move the support member 102 from a completely raised position to a completely lowered position as the actuator link 106 contracts from a completely expanded position (FIG. 5A) to a completely retracted position (FIG. 5C). It is to be understood that, although not shown in FIGS. 5A to 5C, pivot members 107, 14a and 14b are pivotally connected to the frame 12 of the motorcycle 10 (see FIGS. 2 and 3), pivot member 107 being pivotally connected to a position that is lower on the frame 12 then the position of pivot members 14a and 14b, and thus each remains in a fixed position.

It is to be understood that although the illustrative embodiment of the present disclosure includes a pair of front 104a and rear 104b support brackets, their number may vary. Furthermore, in another alternative embodiment, the front 104a and rear 104b support brackets may be replaced by a single bracket in combination with a mechanism to adjust and maintain the inclination of the support member 102.

Referring to FIG. 6, there is shown an adjustable seat support 200 in accordance with a second illustrative embodiment of the present disclosure. The adjustable seat support 200 is generally composed of a support member 102 adapted to support a seat, a front 204a and a pair of rear 204b support brackets pivotally connecting the support member 102 to a vehicle frame via pivot members 203a, 203b, 214a, 216 and base bracket 217, and an actuator link 106, which pivotally connects the rear support brackets 204b to the vehicle frame via pivot members 205 and 107, respectively. The front support bracket 204a is pivotally and slidingly engaged to the support member 102 through slider guide 215a while the rear support brackets 204b are pivotally and slidingly engaged to the base bracket 217 through slider guide 215b. Pivot member 214b, combined with slider guides 215a and 215b, ensure proper raising and lowering of the support member 102.

Referring to FIGS. 7A and 7B, there is shown the displacement of the adjustable seat support 200 components in a push configuration, going from a raised position (FIG. 7A) to a lowered position (FIG. 7B). In this configuration, the pivotal movements of the front 204a and rear 204b support brackets move the support member 102 from a completely raised position to a completely lowered position as the actuator link 106 contracts from a completely expanded position (FIG. 7A) to a completely retracted position (FIG. 7B). It is to be understood that, although not shown in FIGS. 7A and 7B, pivot members 107 and base bracket 217 are connected to the frame 12 of the motorcycle 10, pivot member 107 being pivotally connected to a position which is front wise compared to the position of base bracket 217.

Referring to FIGS. 8A and 8B, there is shown the displacement of the adjustable seat support 200 components in a pull configuration, going from a raised position (FIG. 7A) to a lowered position (FIG. 7B). In this configuration, the pivotal movements of the front 204a and rear 204b support brackets move the support member 102 from a completely raised position to a completely lowered position as the actuator link 106 expands from a completely retracted position (FIG. 8A) to a completely expanded position (FIG. 8B). It is to be understood that, although not shown in FIGS. 8A and 8B, pivot members 107 and base bracket 217 are connected to the frame 12 of the motorcycle 10, pivot member 107 being pivotally connected to a position which is rear wise compared to the position of base bracket 217.

Referring to FIG. 9, there is shown an adjustable seat support 300 in accordance with a third illustrative embodiment of the present disclosure. The adjustable seat support 300 is generally composed of a support member 102 adapted to support a seat, a front 304a and a pair of rear 304b support brackets pivotally connecting the support member 102 to a vehicle frame via pivot members 303a (see FIGS. 10A and 10B), 303b and 314a, 314b, respectively, and an actuator link 106, which pivotally connects the rear support brackets 304b to the vehicle frame via pivot members 305 and 107, respectively.

Referring to FIGS. 10A and 10B, there is shown the displacement of the adjustable seat support 200 components in a pull configuration, going from a raised position (FIG. 10A) to a lowered position (FIG. 10B). In this configuration, the pivotal movements of the front 304a and rear 304b support brackets move the support member 102 from a completely raised position to a completely lowered position as the actuator link 106 expands from a completely retracted position (FIG. 10A) to a completely expanded position (FIG. 10B). It is to be understood that, although not shown in FIGS. 10A and 10B, pivot members 107, 314a and 314b are pivotally connected to the frame 12 of the motorcycle 10, pivot member 107 being pivotally connected to a position that is higher on the frame 12 then the position of pivot members 314a and 314b, and thus each remains in a fixed position.

In another alternative embodiment, the front 104a, 204a, 304a and rear 104b, 204b, 304b support brackets may have different lengths in order to induce a desired inclination to the support member 102, and thus to the seat 110. In a further alternative embodiment, the length of the front 104a, 204a, 304a and rear 104b, 204b, 304b support brackets may be dynamically varied, for example using a length adjustment mechanism operatively connected to either or both of the front 104a, 204a, 304a and rear 104b, 204b, 304b support brackets, in order to control the inclination of the support member 102, and thus of the seat 110.

It is to be understood that the maximum displacement of the support member 102 can be adjusted by the length of the front 104a, 204a, 304a and rear 104b, 204b, 304b, either statically or dynamically, or by the distance between link 105, 305 and pivots 14a (or 14b), 314a, respectively.

It is further to be understood that the actuator 109 may be connected to the various support brackets 104a, 104b, 204b, 304b, with any kind of linkage mechanism in order to change the motion ratio of the actuator link 106 compared to the movement of the support member 102.

Although the present disclosure has been described with a certain degree of particularity and by way of illustrative embodiments and examples thereof, it is to be understood that the present disclosure is not limited to the features of the embodiments described and illustrated herein, but includes all variations and modifications within the scope and spirit of the disclosure as hereinafter claimed.

What is claimed:

1. An adjustable seat support for a vehicle having a frame, comprising:
    a support member adapted to support a seat;
    at least one front support bracket and a pair of rear support brackets pivotally connecting the support member to a first position of the frame of the vehicle, the pair of rear support brackets being spaced apart such that the at least one front support bracket and the pair of rear support brackets may pass each other during a raising and a lowering of the support member; and
    an actuator pivotally connecting the at least one front support bracket and the pair of rear support brackets to a second position of the frame of the vehicle;
    wherein movement of the actuator raises and lowers the support member.

2. An adjustable seat support in accordance with claim 1, wherein the at least one front support bracket includes a pair of front support brackets, the pair of front and rear support brackets being spaced apart such that the pair of front and rear support brackets may pass each other during the raising and the lowering of the support member.

3. An adjustable seat support in accordance with claim 2, wherein the actuator pivotally connects the front support brackets to the second position of the frame of the vehicle.

4. An adjustable seat support in accordance with claim 2, wherein the actuator pivotally connects the rear support brackets to the second position of the frame of the vehicle.

5. An adjustable seat support in accordance with claim 2, wherein the second position is higher on the frame of the vehicle than the first position.

6. An adjustable seat support in accordance with claim 1, wherein the second position is lower on the frame of the vehicle than the first position.

7. An adjustable seat support in accordance with claim 1, wherein the actuator pivotally connects the rear support brackets to the second position of the frame of the vehicle.

8. An adjustable seat support in accordance with claim 1, wherein the second position is front wise on the frame of the vehicle compared to the first position.

9. An adjustable seat support in accordance with claim 1, wherein the second position is rear wise on the frame of the vehicle compared to the first position.

10. An adjustable seat support in accordance with claim 1, further comprising a linkage mechanism connecting the actuator to the at least one front support bracket and pair of rear support brackets in order to change the motion ratio of the actuator compared to the movement of the support member.

11. An adjustable seat support in accordance with claim 1, wherein the actuator is selected from the group consisting of an electronic actuator, a pneumatic actuator, a hydraulic actuator and a mechanical actuator.

12. An adjustable seat support in accordance with claim 1, further comprising a user interface operatively connected to the actuator in order to control its operation.

13. An adjustable seat support for a vehicle having a frame, comprising:
    a support member adapted to support a seat;
    a pair of front and rear support brackets pivotally connecting the support member to a first position of the frame of the vehicle, the lengths of the front support brackets and the rear support brackets being different; and
    an actuator pivotally connecting the least one pair of front and rear support brackets to a second position of the frame of the vehicle;
    wherein movement of the actuator raises and lowers the support member.

14. An adjustable seat support for a vehicle having a frame, comprising:
    a support member adapted to support a seat;
    at least one front support bracket and a pair of rear support brackets pivotally connecting the support member to a first position of the frame of the vehicle;
    an actuator pivotally connecting the least one pair of front and rear support brackets to a second position of the frame of the vehicle; and
    a base bracket having a base bracket slider guide, the base bracket being connected to the first position of the frame of the vehicle, wherein the pair of rear support brackets is pivotally and slidingly engaged to the base bracket slider guide, and wherein the support member includes a support member slider guide, wherein the front support bracket is pivotally and slidingly engaged to the support member slider guide and movement of the actuator raises and lowers the support member.

15. An adjustable seat support for a vehicle having a frame, comprising:
    a support member adapted to support a seat;
    a pair of front and rear support brackets pivotally connecting the support member to a first position of the frame of the vehicle;
    an actuator pivotally connecting the least one pair of front and roar support brackets to a second position of the frame of the vehicle; and
    a length adjustment mechanism operatively connected to at least one of the front support brackets and the rear support brackets in order to adjust its length;
    wherein movement of the actuator raises and lowers the support member.

* * * * *